(12) United States Patent
Chen

(10) Patent No.: US 8,021,746 B2
(45) Date of Patent: Sep. 20, 2011

(54) ARTICLE COMPRISING OXYGEN PERMEABLE LAYER

(75) Inventor: John Chu Chen, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 841 days.

(21) Appl. No.: 11/489,038

(22) Filed: Jul. 19, 2006

(65) Prior Publication Data

US 2008/0020158 A1    Jan. 24, 2008

(51) Int. Cl.
 *B32B 27/08*  (2006.01)
 *B65D 8/00*  (2006.01)

(52) U.S. Cl. ............ 428/304.4; 426/106; 428/34.1; 428/35.7

(58) Field of Classification Search ............ 428/35.7, 428/34.1, 304.4; 426/106
See application file for complete search history.

(56) References Cited

U.S. PATENT DOCUMENTS

| | | |
|---|---|---|
| 3,950,289 A | 4/1976 | D'Amato |
| 4,014,831 A | 3/1977 | Bock |
| 4,685,274 A | 8/1987 | Garwood |
| 4,840,271 A | 6/1989 | Garwood |
| 4,956,212 A | 9/1990 | Bekele |
| 5,025,611 A | 6/1991 | Garwood |
| 5,103,618 A | 4/1992 | Garwood |
| 5,115,624 A | 5/1992 | Garwood |
| 5,346,735 A | 9/1994 | Logan |
| 5,387,470 A | 2/1995 | Parnell |
| 5,402,622 A | 4/1995 | Stockley |
| 5,492,705 A * | 2/1996 | Porchia et al. ............ 426/106 |
| 5,533,622 A | 7/1996 | Stockley |
| 5,556,674 A | 9/1996 | Meilhon |
| 5,597,869 A | 1/1997 | Wang |
| 5,736,398 A * | 4/1998 | Giambernardi et al. ...... 435/383 |
| 5,770,287 A | 6/1998 | Miranda |
| 5,843,540 A | 12/1998 | Heydarpour |
| 5,885,699 A | 3/1999 | Watson |
| 5,916,613 A | 6/1999 | Stockley |
| 2003/0035868 A1 * | 2/2003 | Coulter et al. ............ 426/125 |
| 2003/0180519 A1 * | 9/2003 | Kashiba et al. ............ 428/304.4 |
| 2003/0198715 A1 | 10/2003 | Morris |

FOREIGN PATENT DOCUMENTS

| | | |
|---|---|---|
| WO | WO 98/10928 | 3/1998 |
| WO | WO 99/12735 | 3/1999 |
| WO | WO 2003/089240 A1 | 10/2003 |

OTHER PUBLICATIONS

PCT Notification of Transmittal of the International Search Report, International Application No. PCT/US2007/016195, Mailed Nov. 16, 2007.

* cited by examiner

*Primary Examiner* — Brent O'Hern

(57) ABSTRACT

Disclosed are rigid or semi-rigid multilayer structures that provide high oxygen permeability values comprising metallocene polyethylene, ethylene/vinyl acetate copolymers or highly neutralized blends of ethylene acid copolymers, organic acid salts and optionally one or more ethylene-containing polymers or silicon-containing polymers. Such structures have improved oxygen permeability and are useful in packaging food products such as case ready meat, fish, sausage, fresh produce, and the like that require breathable packages.

21 Claims, No Drawings

ARTICLE COMPRISING OXYGEN PERMEABLE LAYER

The invention relates to semi-rigid or rigid multilayer structures having highly oxygen and/or $CO_2$ permeable compositions as a coating or laminate.

BACKGROUND

In the art of packaging meat, fish, poultry, vegetables, fruits, or other food products, it has been a problem to provide for relatively long shelf life of the packaged goods in a package that will not adversely affect the appearance or keeping qualities of the packaged goods, is relatively simple and inexpensive to manufacture, yet sufficiently robust to protect the packaged goods from damage and spoilage. It is also desirable to control the exposure of the contents to certain gases such as oxygen and carbon dioxide. Some products, such as fresh fish, must be packaged in a package with specific gas permeability properties to ensure food safety. For example, fresh fish is packaged in sufficient oxygen gas to prevent the growth of anaerobic bacteria.

Vacuum skin packaging is a common method of packaging many articles. Skin packaging is a known technique where goods are tightly packaged within a wrapping material and where substantially all of the atmospheric air is excluded. Often the goods are placed in a tray or on a board background to increase the rigidity of the package to allow for better merchandising. When used, the trays or boards are typically prepared with a moisture-impermeable surface to prevent their degradation by moisture from the packaged food product. However, the surface is impermeable not only to moisture, but oxygen as well. In the case of fresh fish, use of an impermeable backing, such as a typical board, base or tray, is not acceptable because the backing blocks the oxygen from contacting the fish.

Packaging has also been known to include certain gases to enhance the keeping qualities of the contents (modified atmosphere packaging). The shelf life of the packaged goods can thereby be enhanced. Typically these packages are made from a plastic material that provides a barrier to the egress of desired gases or the ingress of unwanted gases. In other cases, the plastic material may be such that it allows gases that may be generated within the package to escape. Other known plastic materials allow certain gases to permeate to enhance the keeping qualities of the packaged goods. Films with high oxygen permeability comprising blends of highly neutralized organic acid and ethylene acid copolymers have been disclosed in PCT patent application publication WO03/089240.

U.S. Pat. Nos. 4,685,274; 4,840,271; 5,025,611; 5,103,618 and 5,115,624 describe packages, methods, and apparatus for packaging perishable goods. The packages described therein comprise a semi-rigid or rigid base, typically a tray, perishable goods on the base, a flexible gas permeable plastic web over the goods and the base to at least partially skin pack the goods, and a lid for the base. A package according to these patents also comprises a gas impermeable outer package to provide a headspace that retains a gas selected for enhancing preservation of the packaged goods by permeation of the gas through the gas permeable web. However, these packages are able to retain only a limited volume of the gas in the headspace.

Therefore, it is desirable to provide a moisture-resistant, gas permeable semi-rigid or rigid structure suitable for use as a board, base or tray for packaging food products that require breathable (e.g. oxygen and/or carbon dioxide permeable) packages. The packages can include highly oxygen- and/or $CO_2$-permeable compositions useful as coatings or laminates for rigid or semi-rigid structures for packaging.

SUMMARY OF THE INVENTION

An article comprises a structure layer, an oxygen permeable layer, and optionally at least one other polymer layer wherein the structure layer is a rigid or semi-rigid layer and the oxygen permeable layer comprises or is produced from a composition that comprises or consists essentially of or is produced from one or more E/X/Y copolymers, one or more organic acids, and optionally one or more ethylene-containing polymers, one or more silicon-containing polymers, or combinations of two or more thereof;

E can be derived from ethylene, X can be derived from at least one $C_3$ to $C_8$ $\alpha,\beta$-ethylenically unsaturated carboxylic acid, and Y can be derived from a softening comonomer selected from alkyl acrylate and alkyl methacrylate wherein the alkyl groups have from 1 to 8 carbon atoms, or ionomers of the E/X/Y copolymer;

the organic acid can be aliphatic acids or salts thereof each having fewer than 36 carbon atoms; wherein the acid moieties in the E/X/Y copolymer and organic acid can be nominally neutralized to greater than 70%, 80%, or 90%, or even to 100% and the metal ions present in the mixture can comprise a preponderance of alkaline earth metal ions;

the structural layer, which can be a rigid or semi-rigid, can include cellulose, cellulose derivative, polymer resin, or combinations of two or more thereof; the cellulose or cellulose derivative layer can be in the form of paper, paperboard, cardboard, pulp-molded shape, a perforated sheet, or combinations of two or more thereof; and the polymer resin layer can be in the form of a perforated sheet, an open-cell foam, melt bonded non-woven porous sheet, or combinations of two or more thereof.

The invention also provides a packaging system comprising the article characterized above and optionally a gas permeable film, such as for example, metallocene polyethylene. An embodiment of such packaging system comprises a moisture-resistant gas permeable film comprising or produced from at least one layer comprising or consisting essentially of the composition disclosed above. A specific embodiment of the packaging system is a vacuum skin package.

DETAILED DESCRIPTION OF THE INVENTION

The invention also provides a packaged food product comprising (i) an article of food requiring an oxygen atmosphere selected from the group consisting of case ready meat, fish, sausage or (ii) an article of food requiring removal of $CO_2$ selected from the group consisting of fresh produce and fruits; wherein (i) or (ii) can be enclosed in a package comprising the semi-rigid or rigid multilayer structure as described above.

Many permeable membranes available in the art are microporous, i.e., permeable due to the presence of microscopic pores through which gas and vapor can pass. The compositions disclosed herein can be formed into a monolithic membrane that functions as a selectively permeable barrier. Monolithic membranes, in contrast to microporous membranes, have high water-entry pressure and are waterproof and liquidproof. They also provide effective barriers to microorganisms such as bacteria while remaining gas permeable.

The term "rigid" refers to materials or articles that hold a shape without external support and have higher resistance to deformation by external forces. The term "semi-rigid" refers to materials or articles that hold a shape without external support, but exhibit higher flexibility when external forces are exerted upon the structure.

(Meth)acrylic acid means methacrylic acid and/or acrylic acid and (meth)acrylate means methacrylate and/or acrylate.

An example of a highly oxygen permeable composition is a blend of an ethylene acid copolymer and an organic acid wherein the acid groups or both are neutralized as disclosed above, and optionally an ethylene/alkyl(meth)acrylate copolymer. Layers comprising these highly neutralized blends, optionally in combination with other highly permeable polymeric layers, such as metallocene polyethylene having a density of less than 0.91 g/cc or ethylene/vinyl acetate copolymers as suitable oxygen permeable compositions, and a permeable structural layer can result in breathable semi-rigid or rigid structures. The composition of layer has oxygen permeation values greater than 10,000 mil-cc/m$^2$-day, or greater than 15,000 mil-cc/m$^2$-day, or greater than 20,000 mil-cc/m$^2$-day, or greater than 25,000 mil-cc/m$^2$-day, or greater than 30,000 mil-cc/m$^2$-day, or greater than 35,000 mil-cc/m$^2$-day, as a gas permeable coating or laminate for semi-rigid or rigid packaging material.

A multilayer structure comprising one or more layers or compositions disclosed above can have oxygen and/or $CO_2$ permeability, formability, and structural strength.

Packages comprising these multilayer structures (e.g., boards coated with the oxygen permeable compositions) can be used to package food or nonfood contents where oxygen permeability, mechanical support and controlled fluid barrier properties are important. These packages are useful in packaging food products requiring breathable packages such as case ready meat, fish, sausage, fresh vegetables, fruits, and the like.

The perishable goods to be packaged can be meat, fish, poultry, fresh fruits, or fresh vegetables. Other types of goods can be packaged if desired. These perishable goods are subject to exposure to and contamination by microbial organisms such as bacteria, molds and the like by contact with airborne organisms or by contact with organisms on surfaces. The contamination can result in accelerated spoilage, toxin formation and other harmful effects. Thus it is desirable to protect the goods from contact with microbial organisms. Packaging such perishable goods in gas impermeable materials such as foil, coated paperboard and oxygen barrier films can provide a barrier to microbial contamination.

Bacterial organisms can be either aerobic or anaerobic (e.g., *Clostridium botulinum*). *C. botulinum* produces a potent toxin that is the causative agent of botulism, an extremely virulent, dangerous food poisoning. *C. botulinum* contamination is problematic in fresh fish. Traditionally, fresh fish has been sold in ice-chilled containers open to the atmosphere to minimize the growth of *C. botulinum* and consequent toxin formation. Such sales methods previously have been limited to relatively small geographic areas near the bodies of water where the fish were caught. For broader distribution, fish has traditionally been frozen.

With modern distribution methods, the desire of consumers in distant regions to consume fresh fish rather than frozen fish has increased. However, packaging of fresh fish to minimize the dangers of botulism is difficult. *C. botulinum* growth and toxin formation can occur as a result of time/temperature abuse during processing, storage, and distribution. A package that allows oxygen to contact the surface of the fish can minimize the growth of *C. botulinum*. Thus, packages for fresh fish desirably not only provide a physical barrier to moisture and microbial and other contamination, but also provide for oxygen permeability.

Vacuum packaging inhibits the growth of common spoilage organisms, but does so under conditions that exclude oxygen and therefore does not inhibit the growth of *C. botulinum*. Therefore, vacuum packaging under conditions that exclude oxygen increases the likelihood that toxin can be formed before the product becomes unacceptable to consumers because of observable spoilage.

US Food and Drug Administration guidance defines that packages with OTR (oxygen transmission rate) greater than or equal to 10,000 cc/m$^2$/24 hr can be regarded as oxygen permeable. An OTR greater than or equal to 10,000 cc/m$^2$/24 hr is unattainable with typical foam trays or coated paperboard used in packaging foodstuffs such as fresh fish.

This invention provides packages that allow perishable goods such as fresh fish to be packaged such that they are readily exposed to oxygen on all surfaces, thus inhibiting anaerobic bacterial growth. When packaging goods such as fish, it is also possible to retain the usual drip liquid purge within the fish but to allow for oxygen to permeate through the oxygen permeable backing.

Another example of a food product requiring oxygen permeable packaging is case ready red meat. The fresh red meat industry is moving towards centralized processing and packaging to cut costs and improve food safety by reducing the number of steps in which the meat is handled through the value chain. Several systems are under consideration for the pre-packaging of fresh red meat. One system involves vacuum skin-packaging whole muscle cuts and placing the individual packages into a barrier "master pack". The master pack prevents oxygen from spoiling the meat, allowing for longer distribution times associated with centralized packaging. Once the master packs reach the grocery store, personnel open the master pack and remove the individual packages. The color of fresh meat changes with concentration of oxygen. The meat is bluish purple in the oxygen-starved environment of the master pack. Consumers prefer a bright red color that occurs with a high oxygen concentration. Thus, once the individual packages are removed from the master pack, oxygen transmission into the package can be rapid to allow the meat to turn red quickly, thereby packaging with high oxygen permeability is desired.

Although the multilayer structures and packages are described herein mainly in terms of desirable oxygen permeability, permeability to other gases such as carbon dioxide is often another desirable feature for packages. For example, produce such as fresh fruit and vegetables produce carbon dioxide during respiration and the carbon dioxide can react with moisture in the package to form carbonic acid. The carbonic acid formed can affect the quality of the produce. Therefore it is also desirable for certain packaging, such as for fresh fruits and vegetables, to have high permeability to carbon dioxide to allow for permeation of carbon dioxide out of the package.

Of note are compositions, multilayer structures and packages as described herein having carbon dioxide permeation values greater than 10,000 mil-cc/m$^2$-day, or greater than 15,000 mil-cc/m$^2$-day, or greater than 20,000 mil-cc/m$^2$-day, or greater than 25,000 mil-cc/m$^2$-day, or greater than 30,000 mil-cc/m$^2$-day, or greater than 35,000 mil-cc/m$^2$-day.

The ethylene acid copolymers can be "direct" acid copolymers such as those comprising repeat units derived from an $\alpha$-olefin, such as ethylene, at least one monomer derived from a $C_{3-8}$ $\alpha,\beta$-ethylenically unsaturated carboxylic acid, and optionally a softening monomer. Softening refers to the crystallinity being disrupted (the polymer is made less crystalline). The acid copolymers can be described as E/X/Y copolymers disclosed above where E is ethylene, X is derived from at least one α,β-ethylenically unsaturated carboxylic acid, and Y is a softening comonomer.

X can be selected from unsaturated acids such as acrylic acid, methacrylic acid, maleic acid, fumaric acid, itaconic acid, or combinations of two or more thereof; monoester of fumaric acid, itaconic acid, or maleic acid (maleic half esters) including esters of $C_1$ to $C_4$ alcohols such as for example, methyl, ethyl, n-propyl, isopropyl and n-butyl alcohols. Acrylic and methacrylic acid are preferred.

Softening comonomers as Y can include alkyl acrylate, alkyl methacrylate, or combinations of two or more thereof wherein the alkyl group has from 1 to 8 or 1 to 4 carbon atoms.

X can be present from about 3 to about 30, 4 to 25, or 5 to 20, weight % of the E/X/Y copolymer, and Y is from 0 to about 35, 0.1 to 35, or 5 to 30, weight % of the E/X/Y copolymer.

Specific acid copolymers include ethylene/(meth)acrylic acid copolymers, ethylene/(meth)acrylic acid/n-butyl(meth)acrylate copolymers, ethylene/(meth)acrylic acid/iso-butyl (meth)acrylate copolymers, ethylene/(meth)acrylic acid/tert-butyl(meth)acrylate copolymers, ethylene/(meth)acrylic acid/methyl(meth)acrylate copolymers, ethylene/(meth)acrylic acid/ethyl(meth)acrylate copolymers, or combinations of two or more thereof.

Other acid copolymers include ethylene/maleic acid and ethylene/maleic acid monoester copolymers, ethylene/maleic acid monoester/n-butyl(meth)acrylate copolymers, ethylene/maleic acid monoester/methyl(meth)acrylate copolymers, ethylene/maleic acid monoester/ethyl(meth)acrylate copolymers, or combinations of two or more thereof.

The unmodified, melt processible ionomers can be prepared from the acid copolymers, particularly ethylene/(meth)acrylic acid copolymers, by treatment with a basic compound capable of neutralizing the acid moieties of the copolymer. The unmodified ionomers may be nominally neutralized to any level from about 15 to about 90% or about 40 to about 75% of the acid moieties of the acid copolymer are nominally neutralized by an alkaline earth metal cation, an alkali metal cation, or a transition metal cation. For acid copolymers having a high acid level (for example, over 15 weight %), the percent neutralization may be lower to retain melt processibility. Ionomers can be prepared with nominal neutralization levels higher than 70% as disclosed above when blended with the organic acids.

Processes for producing acid copolymer and ionomers are well known to one skilled in the art and, the description of which is omitted herein for the interest of brevity.

The organic acids can be aliphatic, mono-functional (saturated, unsaturated, or multi-unsaturated) organic acids including those $C_4$ to less than $C_{36}$, $C_6$ to $C_{26}$, or $C_6$ to $C_{22}$ such as stearic acid or isostearic acid.

Saturated, branched organic acids are acids comprising at least one CH (methenyl) moiety and at least two $CH_3$ (methyl) moieties. In contrast, saturated, linear organic acids are acids comprising only one $CH_3$ and no CH moieties. For example, branched saturated branched organic acids include those substituted with from one to three $C_1$-$C_8$ alkyl substituents. Saturated, branched organic acids may be preferred to provide greater oxygen permeability. A saturated, branched acid of particular note is isostearic acid.

Specific organic acids can include caproic acid, caprylic acid, capric acid, lauric acid, palmitic acid, stearic acid, isostearic acid, behenic acid, erucic acid, oleic acid, linoleic acid, or combinations of two or more thereof.

Salts of the organic acids can be used where the metal includes alkaline earth metals, such as barium, strontium, magnesium, calcium, or combinations of two or more thereof. Frequently employed includes magnesium and calcium salts.

At 100% neutralization (i.e., all acid moieties in the copolymer and organic acid are nominally neutralized), organic acids with lower carbon content can be used. Non-volatile (not volatilize at temperatures of melt blending of the agent with the acid copolymer) or non-migratory (not bloom to the surface of the polymer under normal storage conditions, such as at ambient temperatures) organic acid or salt is desirable.

The acid copolymer and organic acid can be neutralized with one or more alkaline earth metal compounds. A composition can be prepared from a heated mixture comprising or consisting essentially of one or more E/X/Y copolymers disclosed above and from 0.1 to 10 weight % of an alkaline earth metal compound capable of neutralizing acidic groups in the acid copolymer and the organic acid.

The amount of alkaline earth metal compound may be the stoichiometric amount (minor amounts of other cations may be present). Calcium and magnesium cations are of note. The compounds include formates, acetates, nitrates, carbonates, hydrogencarbonates, oxides, hydroxides or alkoxides of alkaline earth metals. Of note includes magnesium hydroxide, calcium hydroxide, magnesium carbonate, calcium carbonate, or combinations of two or more thereof. Other metal compounds such as alkali metal compounds, transition metal compounds, can be present in minor quantities with the alkaline earth metal compounds, which are calculated to neutralize a target amount of acid moieties in the acid copolymer and organic acid(s) in the blend (referred to as "% nominal neutralization" or "nominally neutralized"). Nominal neutralization levels of all acid moieties in the composition can be at least 70, 80, or 90%, or even 100%.

Antioxidant additives that may be useful in modifying the organoleptic properties (e.g., reducing odor or taste) of the blends of organic acid and ethylene copolymers can be used. Antioxidants may also be used when the organic acid is unsaturated. Phenolic antioxidants such as IRGANOX from Ciba Geigy Inc. (Tarrytown, N.Y.) may be used. IRGANOX 1010 is another antioxidant suitable for use.

The highly neutralized organic acids and ethylene acid copolymers optionally may be further blended with ethylene-containing polymers such as polyethylene homopolymers and copolymers such as low density polyethylene (LDPE), linear low density polyethylene (LLDPE), ultra-low density polyethylene (ULDPE), metallocene polyethylene (mPE); ethylene propylene copolymers; ethylene/propylene/diene monomer (EPDM) terpolymers; and ethylene copolymers derived from copolymerization of ethylene and at least one comonomer selected from the group consisting of alkyl (meth)acrylate, vinyl acetate, and CO. The ethylene-containing polymers also include the grafted compositions of the above mentioned polymers with maleic acid, maleic anhydride, and maleic acid, mono-ester. Of note are ethylene/vinyl acetate copolymers. Of note are ethylene/alkyl (meth)acrylate copolymers wherein the alkyl groups have from 1 to 8 carbon atoms.

Polyethylene (PE) homopolymers and copolymers used in the compositions can be prepared by a variety of methods, for example but not limitation, the well-known Ziegler-Natta catalyst polymerization (see, e.g., U.S. Pat. Nos. 4,076,698 and 3,645,992), metallocene catalyzed polymerization, Versipol®-catalyzed polymerization and by free radical polymerization. The polymerization can be conducted as solution phase processes, gas phase processes, and the like. Polyethylene polymers can include linear polyethylenes such as high density polyethylene (HDPE), linear low density polyethylene (LLDPE), very low or ultralow density polyethylenes (VLDPE or ULDPE) and branched polyethylenes such as low density polyethylene (LDPE).

The densities of polyethylenes can range from about 0.865 g/cc to about 0.970 g/cc. Linear PEs can incorporate one or more α-olefins containing 3 to about 20 carbon atoms and up to about 20% by weight of the copolymer. The α-olefins include propylene, 1-butene, 1-hexene, 4-methyl-1-pentene, 1-octene, 1-decene, 1-tetradecene, 1-octadecene, or combinations of two or more thereof. Blends of two or more of PEs can also be used. A PE copolymer may also be an ethylene propylene elastomer containing a small amount of unsaturated compounds having a double bond.

Commercial PE includes a copolymer of ethylene and 1-butene containing 12.6 weight % 1-butene, having a melt index of 3.5 available as Exact® from ExxonMobil and a copolymer of ethylene and 1-octene with 12 weight % octene, having a melt index of 3.5 available as Engage® from DuPont Performance Elastomers.

Without being held to any theory, mPE is substantially linear with narrow molecular weight distribution. See, e.g., U.S. Pat. Nos. 5,272,236; 5,278,272, 5,507,475, 5,264,405, and 5,240,894. Metallocene technology is capable of making lower density mPE with high flexibility and low crystallinity, with good oxygen permeability.

The metallocene polyethylene can be any such polyethylene and may have a density less than 0.91 g/cc at which densities the normalized oxygen permeation value (OPV) at 23° C. and 50% relative humidity may be greater than about 12,400 cc-mil/m$^2$·day·atm. This mPE can optionally be blended with other low crystalline polyolefin or amorphous polyethylenes (such as low density polyethylene, LDPE; linear low density polyethylene, LLDPE; other mPE and the like) provided the structure retains significantly high oxygen permeability.

Ethylene copolymers having small amounts of a diolefin component such as butadiene, norbornadiene, hexadiene and isoprene are also generally suitable. Terpolymers such as ethylene/propylene/diene monomer (EPDM) are also suitable.

Ethylene-containing polymers may also include one or more ethylene copolymers obtained from copolymerization of ethylene with at least one polar monomer such as ethylene/vinyl acetate copolymers, ethylene/acrylic ester copolymers, ethylene/methacrylic ester copolymers, ethylene/vinyl acetate/CO copolymers, ethylene/acrylic ester/CO copolymers, and/or mixtures of any of these.

Ethylene/vinyl acetate (EVA) copolymers have OPV ranging from about 10,000 to about 14,000 cc-mil/m$^2$-day and can be used as a coating, either as a monolayer coating or as part of a multilayer coating.

The relative amount of the vinyl acetate comonomer incorporated into EVA can be from 0.1 weight % up to as high as 40 weight percent of the total copolymer or even higher. For example, EVA can have a vinyl acetate content of from 2 to 40% by weight, or 6 to 30% by weight. EVA may be modified by methods well known in the art, including modification with an unsaturated carboxylic acid or its derivatives, such as maleic anhydride or maleic acid. EVA may have a melt flow rate (ASTM D-1238) from 0.1 to 60 g/10 minutes, or 0.3 to 30 g/10 minutes.

Ethylene/alkyl(meth)acrylate copolymers includes copolymers of ethylene and alkyl acrylates or alkyl methacrylates wherein the alkyl moiety contains from one to eight carbon atoms. Examples of alkyl acrylates include methyl acrylate, ethyl acrylate and butyl acrylate. "Ethylene/methyl acrylate (EMA)" means a copolymer of ethylene (E) and methyl acrylate (MA). "Ethylene/ethyl acrylate (EEA)" means a copolymer of ethylene and ethyl acrylate (EA). "Ethylene/butyl acrylate (EBA)" means a copolymer of ethylene and butyl acrylate (BA).

Alkyl(meth)acrylate comonomer may be incorporated into the ethylene/alkyl(meth)acrylate copolymer from 0.1 weight % up to 45 weight % of the total copolymer or even higher. The alkyl group can contain 1 to about 8 carbons. For example, the alkyl(meth)acrylate comonomer can be present in the copolymer from 5 to 45, 10 to 35, or 10 to 28, weight %. The alkyl group in the alkyl(meth)acrylate comonomer can be methyl, ethyl, iso-butyl or n-butyl.

Ethylene/alkyl(meth)acrylate copolymers can be prepared by processes well known in the art using either autoclave or tubular reactors. See e.g., U.S. Pat. Nos. 5,028,674; 2,897,183; 3,404,134; 5,028,674; 6,500,888 and 6,518,365, the disclosures of which are incorporated herein by reference. Because the processes are well known, the disclosure of which is omitted herein for the interest of brevity. Ethylene/alkyl (meth)acrylate copolymers are commercially available from E. I. du Pont de Nemours and Company (DuPont). The ethylene/alkyl (meth)acrylate copolymers can have a melt index of 0.1 to about 100.

A mixture of two or more different ethylene/alkyl(meth)acrylate copolymers can be used. Of note is a composition wherein at least one ethylene/alkyl(meth)acrylate copolymer is present in up to 50 weight %.

The highly neutralized organic acids and ethylene acid copolymers can be further blended with silicon-containing polymers. Silicon-containing polymers can include ethylene vinyl silane copolymers, polysiloxane, silicone rubber, or combinations of two or more thereof.

Ethylene vinyl silane copolymers can be prepared in a high-pressure reactor by polymerizing ethylene with vinyl silane, or by extruder grafting of a polyethylene with vinyl silane. Graft copolymers can be prepared from any polyethylene homopolymer or copolymer, allowing for greater variety of properties. Ethylene vinyl silane copolymers are available commercially from PolyOne.

Polysiloxanes comprise chains of silicon-oxygen bonds. They can be produced by reacting dichorosilane monomers with water to produce hydroxyl intermediates that condense to form a polymeric structure. Polydimethylsiloxanes have only methyl substituents on the polymer chain. Polysiloxanes are available commercially from Akzo Nobel.

Silicone rubbers have methyl and vinyl groups on the polymer chain. Some silicone rubbers have combinations of methyl, vinyl phenyl and/or fluoro substituents. Silicone rubber elastomers are available from Dow Corning.

A melt-processible, modified ionomer blend can be produced by heating a mixture of the carboxylic acid copolymer(s) or ionomer(s), the organic acid(s) or salt(s) thereof, the basic compound, and optionally the ethylene-containing and/or silicon-containing copolymer. For example, the components can be mixed by (a) melt-blending ethylene α,β-ethylenically unsaturated $C_{3-8}$ carboxylic acid copolymer(s) or ionomer(s) thereof that are not neutralized to the level that they have become intractable (may not be melt-processible) with one or more organic acids or salts thereof, and concurrently or subsequently (b) combining a sufficient amount of a basic compound capable of neutralization of the acid moieties (in the acid copolymer and in the organic acid), to nominal neutralization levels greater than 70, 80, 90%, to near 100%, or to 100% or above, and optionally (c) combining with an ethylene-containing polymer, a silicon-containing polymer, or combinations thereof.

The organic acid (e.g., oleic acid, stearic acid, behenic acid, erucic acid, isostearic acid, or combinations of two or more thereof) or salts thereof may be present in a range of about 2 to about 50, about 4 to about 40, about 4 to 30, about 4 to 20, or about 4 to 15, parts per hundred (pph) by weight of the ethylene acid copolymer or ionomer thereof.

Treatment of acid copolymer and organic acid with basic compound concurrently or subsequently, without the use of an inert diluent, to prepare the composition may not lose processability or properties such as toughness and elongation to a level higher than that which would result in loss of melt processability and properties for the ionomer alone.

The acid copolymer or ionomer can be melt-blended with the organic acid or salt and other polymers in any manner known in the art. For example, a salt and pepper blend of the components can be made and the components can then be melt-blended in an extruder.

The melt-processible, acid copolymer/organic acid (or salt) blend can be treated with the basic compound by methods known in the art, such as melt-mixing. For example, a Werner & Pfleiderer twin-screw extruder can be used to mix the acid copolymer and the organic acid and treat with the basic compound at the same time. The components may be intimately mixed, allowing the basic compound to neutralize at least a portion of the acidic moieties in the other components. Neutralization levels can be determined using infra red spectroscopy by comparing an absorption peak attributable to carboxylate anion stretching vibrations at 1530 to 1630 $cm^{-1}$ and an absorption peak attributable to carbonyl stretching vibrations at 1690 to 1710 $cm^{-1}$.

The additional optional polymer can be combined with other components simultaneously with mixing and neutralization or subsequently by any manner known in the art. For example, the additional polymer can be blended in downstream from the process of the organic acid or salt modification (mixing and neutralization) of the acid copolymers or ionomers in a continuous melt mixer, such as a single-screw or twin-screw extruder.

The resulting highly neutralized composition (an organic acid modified ionomer blend composition) can be used as a coating for rigid or semi-rigid multilayer structures.

The oxygen permeability of a multilayer structure is related to the thickness and permeability of each of the layers in the following manner:

$$\frac{1}{OPV_{structure}} = \frac{x_1}{OPV_1} + \frac{x_2}{OPV_2} + \ldots \quad (1)$$

where $OPV_{structure}$ is the permeability of the structure normalized to 1 mil, $OPV_1$ is the permeability of layer 1, $OPV_2$ the permeability of layer 1, $x_1$ is the fraction of the film thickness that comprises layer 1, and $x_2$ is the fraction of the film thickness that comprises layer 2. Using formula (1), one can find combinations of highly permeable and less permeable materials that achieve the desired permeability of the application, while maintaining desired strength and forming properties. A similar relation applies to the $CO_2$ permeability of a multilayer structure, in which the $CO_2$ permeability replaces the oxygen permeability in formula (1).

For example, a two-layer structure comprising a nonmodified ionomer and an organic acid modified ionomer blend composition (e.g. Ex. 3) will have the oxygen permeability values indicated:

$OPV_{Ionomer}$=5422 cc-mil/$m^2$-day $OPV_{Ex.3}$=43,200 cc-mil/$m^2$-day.

Using formula (1), the permeability of two-layer structures with different layer ratios can be determined. Example permeabilities are reported in the following table.

| $X_{Ionomer}$ | $X_{Ex\,3}$ | $OPV_{structure}$ |
|---|---|---|
| 0 | 1 | 43,200 |
| 0.2 | 0.8 | 18,049 |
| 0.4 | 0.6 | 11,407 |
| 0.6 | 0.4 | 8,339 |
| 0.8 | 0.2 | 6,571 |
| 1 | 0 | 5,422 |

Thus, it is possible to achieve a highly permeable multilayer structure by combining a skin layer of a standard ionomer with a layer of organic acid modified ionomer blend. For example, a two-layer structure with an OPV of 10,000 cc-mil/$m^2$-day can be prepared with a layer of ionomer 0.475 times the total thickness of the structure and a layer of organic acid modified ionomer blend 0.525 times the total thickness. A three-layer structure with the same OPV can be prepared using an inner layer of organic acid modified ionomer blend 0.525 times the total thickness and two outer layers of ionomer, each 0.2375 times the total thickness. Accordingly, oxygen permeable multilayer structures for packaging, for example, case ready meat can be achieved.

Organic acid modified ionomer blend compositions can allow flexibility in designing a multilayer structure with the desired high permeability properties because they have three to six times (or more) the permeability of nonmodified ionomers. For example, these organic acid modified ionomer blends have an oxygen permeability value (OPV, normalized to one mil thickness) greater than 10,000 mil-cc/$m^2$-day, greater than 15,000 mil-cc/$m^2$-day, greater than 20,000 mil-cc/$m^2$-day, greater than 25,000 mil-cc/$m^2$-day, greater than 30,000 mil-cc/$m^2$-day, or greater than 35,000 mil-cc/$m^2$-day. Such compositions can be used to prepare semi-rigid or rigid multilayer structures having high oxygen permeability.

The rigid or semi-rigid packaging structures comprise at least one rigid or semi-rigid structure layer comprising paper, paperboard, cardboard, pulp-molded shape, an open-cell foam, or a perforated sheet. The structure layer is preferably not coated with other film or polymer. The rigid or semi-rigid layer can allow oxygen to pass through its structure. In some cases, the microscopic structure of the material comprising the layer allows oxygen to permeate through the structure. Alternatively, sheets of cellulose or polymeric material may be perforated (including microperforation) to facilitate passage of oxygen through the structure.

Paper, paperboard, cardboard and the like refer to physical forms derived from cellulose or its derivatives that have been processed as a pulp and formed by heat and/or pressure into sheets. Paper describes thin sheets made from cellulose pulp that are somewhat flexible or semi-rigid. Paperboard and cardboard are thicker, rigid sheets or structures. Cardboard can be a monolithic sheet or can have a more complex structure, such as corrugation. Corrugated cardboard comprises a sheet of corrugated paper adhesively sandwiched between two flat sheets of paper.

A variety of polymeric materials may be used to prepare the permeable layer that allows the passage of oxygen through the structure. For example, polymeric materials may be processed into a pulp or a melt and formed by heat and/or pressure into sheets or other shapes by molding. Polymeric sheets may be perforated.

Polymers may also be formed into layers of open-cell foam, which means that the individual cells of the foam are in complete, unobstructed communication with adjoining cells. The cells in such substantially open celled foam structures have intercellular openings or "windows" that are large enough to permit ready fluid (gas and vapor) transfer from one cell to another within the foam structure and consequently pass through the structure.

Open cell foams can be obtained by taking a polymeric composition, optionally together with any additives used to control foam properties, supplying these to an extruder, subjecting these materials to melting under heating and kneading, then supplying a foaming agent and forming a foaming molten resin mixture, then regulating processing parameters such as the extrusion temperature, pressure inside the extrusion die, discharge volume, etc., and extruding the mixture from the die into a low pressure region and causing foaming. For mixing the components methods known in the art can be utilized, such as dry blending the mixture components or using a screw feeder or the like to introduce each of the mixture components from a raw material supply port and mixing them together inside the extruder. By selecting the die attached to the tip of the extruder according to the shape of the foam desired, extruded foam of various shapes can be manufactured.

The foaming agents can be physical foaming agents or decomposing-type chemical foaming agents, but the use of physical foaming agents is preferred in order to obtain extruded open cell foam. For physical foaming agents, low boiling hydrocarbons such as propane, n-butane, isobutane, n-pentane, isopentane, n-hexane, cyclohexane, etc., chlorinated hydrocarbons such as methyl chloride and ethyl chloride, fluorocarbons such as 1,1,1,2-tetrafluoroethane and 1,1-difluoroethane, and other materials such as carbon dioxide, nitrogen and water may be utilized. For decomposing-type foaming agents, azodicarbonamide and the like may be employed. The foaming agents can be used in mixtures of two or more, and a decomposing type may be used together with a physical type and thus serve to regulate cell diameter.

In addition to their use in the organic acid modified ionomer blend composition, ethylene-containing polymers or ionomers can be employed as oxygen-permeable coatings or layers in multilayer structures, provided their oxygen permeability and/or mechanical properties are sufficiently high to afford the requisite breathability and strength necessary for the intended multilayer structures of interest.

The multilayer structure may also comprise at least one other polymeric layer consisting essentially of one or more ethylene-containing polymers as disclosed above.

Blend of an ionomer, an organic acid salt, and optional ethylene/alkyl(meth)acrylate copolymer or silicon-polymer, neutralized with alkaline earth cations such as magnesium and calcium, are good moisture barriers.

The combination of high oxygen and carbon dioxide permeability and high moisture barrier make such compositions useful for preparing multilayer structures in which the organic acid modified ionomer blend is used as an oxygen-permeable, coating or laminate on a permeable board. Such boards are particularly well suited for packaging food products requiring breathable structures such as case ready meat, fish, sausage, fresh produce, and the like. It is desirable to package these food products in structures that allow atmospheric oxygen to permeate into the package or carbon dioxide to permeate out of the package. Because these food products are moist, it is less desirable to have a highly moisture permeable coating on the board. High moisture transmission rates would allow moisture from the food product to permeate into the board, leading to a degradation of the integrity of the board. This may also have an effect on the quality of the food product.

Examples of multilayer structures include structures comprising a board, tray or backing (indicated as Board in the example structures below) coated or laminated with at least one layer of organic acid modified ionomer blend (e.g. a blend of highly neutralized ionomer, organic acid and ethylene/alkyl(meth)acrylate copolymer), indicated as Blend in the example structures below, with layers of nonmodifed ionomers, indicated as Ionomer in the example structures below, and/or metallocene polyethylene, indicated as mPE in the example structures below:

Blend/Board; Blend/Ionomer/Board; Blend/mPE/Board; Ionomer/Blend/Ionomer/Board; mPE/Blend/mPE/Board; mPE/Blend/Ionomer/Board; and Blend/Ionomer/mPE/Board.

It is also desirable to coat both principal faces of the board with an oxygen- and $CO_2$-permeable composition as described herein, providing, for example: Blend/Board/Blend; Ionomer/Blend/Board/Blend/Ionomer; and mPE/Blend/Board/Blend/mPE.

Depending on the thickness and compositions of the individual layers of the multilayer structure, such structures may have OTRs greater than 8,000 $cc/m^2$-day, greater than 10,000 $cc/m^2$-day, greater than 15,000 $cc/m^2$-day, greater than 20,000 $cc/m^2$-day, greater than 25,000 $cc/m^2$-day, greater than 30,000 $cc/m^2$-day, or greater than 35,000 $cc/m^2$-day.

One or more additives used in the art can be present in the respective layers of the multilayer structure including the presence of adhesive (tie) layers and the like. The additives can include antioxidants and thermal stabilizers, ultraviolet (UV) light stabilizers, pigments and dyes, fillers, anti-slip agents, plasticizers, other processing aids, or combinations of two or more thereof.

A coating comprising an oxygen and $CO_2$ permeable composition, such as an organic acid modified ionomer blend composition, can be coated onto a substrate in processes well known in the art, including, for example, extrusion coating, extrusion lamination, coextrusion coating, or coextrusion lamination.

For example, a multilayer structure can be prepared by extrusion coating an organic acid modified ionomer blend onto a substrate (e.g. paperboard) as follows: dried granulates of the blend (and granulates of compositions for other layers, if present) are melted in single screw extruder. The molten polymer(s) are passed through a flat die to form a molten polymer curtain wherein the compositions of the individual layers are present in a laminar flow. The molten curtain drops onto the moving porous structural substrate to be immediately pressed into that substrate and quenched by a quench drum.

A multilayer structure can also be made by lamination of a film comprising at least one layer of the desired multilayer structure to a substrate by means of an inner layer applied in molten form to adhere the film to the substrate. The process involves laying down a molten curtain of the inner layer composition between the film and substrate moving at high speeds as they come into contact with a cold (chill) roll. The melt curtain is formed by extruding the inner layer composition through a flat die.

A monolayer film or multilayer film can be used as a lamination substrate to prepare a corresponding multilayer structure. When used as a lamination substrate, the film may comprise a highly neutralized organic acid-modified ionomer blend composition. The inner layer composition may not comprise the blend. The inner layer composition can be selected to provide adequate adhesion between the film substrate and the semi-rigid or rigid substrate.

As indicated above, a packaging system may comprise oxygen permeable flexible films including films comprising mPE or the highly neutralized organic acid copolymer blend disclosed above. Other films are described in US2003198715.

The films or sheets for use as lamination substrates or as flexible films for use in packaging, can be made by any method known to one skilled in the art. For example, the film and film structures can be cast, blown, extruded, co-extruded, and the like including orientation (axially or biaxially) by various methodologies (e.g., blown film, bubble techniques, mechanical stretching or the like), extrusion coated or laminated. One or more additives disclosed above can be used. The films or sheets may be prepared in flat sheet or tubular form.

The semi-rigid or rigid multilayer structures can be used as the structural elements such as a board, tray, backing, or clam shells in packaging items, including perishable products such as foodstuffs, that need to be packaged in oxygen permeable packaging. The structures are sized so that they provide sufficient surface for the perishable product to be placed. For example, but not limitation, they may define a packaging area from about 10 to about 30 cm in length and from about 10 to about 30 cm in width, on which the products to be packaged are placed. The shaped perimeter may be, for example, rectangular. The corners of the perimeter may be square or rounded off. Although generally described herein in terms of rectangular areas, other shapes may be envisioned. The thickness of this embodiment of the multilayer structure may be from about 0.1 to about 25 mm or about 0.1 mm to about 10 mm or about 1 to about 5 mm.

Packages may be formed of one or more portions of oxygen-permeable film or sheet bonded together, for example, by heat sealing to prepare the form of pouches, packets, half shells, and the like, into which the packaged product and the semi-rigid or rigid multilayer structure, which serves as a structural support to the packaged product, are placed.

A packaging system includes vacuum skin packaging with which a perishable product is placed on a board comprising the semi-rigid or rigid multilayer structure, which is placed on a first flexible web of gas permeable skin wrapping plastic material in contact with the inside face of said first flexible web. A second flexible web of gas permeable skin wrapping plastic material is placed over the perishable product and multilayer structure and in contact with the product, multilayer structure, and the inside face of the first flexible web; and the first flexible web and the second flexible web are sealed to each other to contain the perishable product. A single web of gas permeable material may provide both the first and second webs by folding the single web around to object to be packaged thereby forming a package.

The multilayer structures may be shaped, thermo-formed, embossed, textured and the like to provide a pleasing appearance for the package. The structures may also be printed with designs, logos, alphanumeric text and/or the like to provide a pleasing appearance for the package and/or to provide information to the consumer.

In addition to their use as structural support elements in packaging, the semi-rigid or rigid multilayer structures can be used in other forms of packaging, such as containers, tubes, boxes, half shells, and the like that enclose a product.

A multilayer sheet comprising the oxygen and $CO_2$ permeable compositions may be further processed by thermoforming into a shaped article by, for example, forming into a shaped piece that could be included in packaging. Thermoformed articles have a shape in which a sheet of material forms a concave surface such as a tray, cup, can, bucket, tub, box, clam shells, or bowl. The thermoformed sheet may be shaped to match the shape of the item(s) to be packaged therein. Because such thermoforming is well known to one skilled in the art, the description of which is omitted herein by reference.

Packages can be formed of two thermoformed shapes (e.g. a top portion and a bottom portion) that can be joined together at their edges to enclose the item to be packaged after it is placed within the package. The joining can be by mechanical means such as friction-fit rims, or by adhesive means such as a hot-melt adhesive. Preferably, the packaging portions are joined by heat-sealing, in which the inner surfaces of the packaging portions are bonded or fused together by application of heat and pressure to form a hermetic seal. Alternatively, the package can be a single article comprising top and bottom portions formed side-by-side with a fold or hinge area that can enclose a product by folding the package at the hinge area so that the top and bottom portions overlap and can be joined as described above. A package may also comprise a thermoformed portion such as a tray or cup and a flexible lidding film that can be heat-sealed to the thermoformed portion. Of note are such packages comprising an oxygen permeable film as described herein, such as film comprising metallocene polyethylene or a highly neutralized organic acid modified ethylene copolymer blend.

A multilayer sheet may also be formed into shapes by processes such as rolling, folding, bending and the like to provide packaging containers. For example, a sheet comprising paperboard and an oxygen permeable composition as described above could be formed into a tube by joining opposite edges, such as by adhesive means. Of note is such a tube that has a spiral joint. Other packages include multilayer sheets folded into cubes, cartons, boxes, sleeves and the like. In some cases, the folded package may have portions joined together by adhesive means such as by hot-melt adhesives. Multilayer structures having heat-sealable surfaces can be joined by treatment with heat and pressure.

The following Examples are presented to further illustrate, but is not to be construed to unduly limit the scope of, the invention.

EXAMPLES

Cast films were prepared from the materials listed below to illustrate the enhanced OTR associated with a structural layer involving a neutralized blend of ionomer, organic acid and ethylene/alkyl (meth)acrylate copolymers. OPV was measured for each cast film at 23° C. and 50% relative humidity. The data expressed as a normalized oxygen permeation rate at one mil thickness are presented in Tables 1 & 2 (C1 was a comparative example), all resins and neutralizing agent were in weight %, and show that a structure comprising a highly neutralized blend of ionomer, organic acid and optional ethylene/alkyl(meth)acrylate copolymers had more than five times the OPV (mil-cc/$m^2$/24 hr) of a structure comprising a standard ionomer. Materials used are as follows.

Ionomer1: an E/15% MAA (methacrylic acid) dipolymer partially neutralized with Mg, having a MI (melt index) of 0.75.

Ionomer2: an E/23.5% nBA (n-butyl acrylate)/9% MAA terpolymer partially neutralized with Mg, having a MI of 0.95.

Ionomer3: an E/10% MAA dipolymer partially neutralized with Na, having a MI of 1.3.

EMA1: An E/24% MA (methacrylate) dipolymer, having a MI of 2.
EMA2: An E/24% MA dipolymer, having a MI of 20.
EBA1: An E/27% nBA dipolymer, having a MI of 4.
EMAA1: An E/15% MM dipolymer with MI of 60.
NA1: A neutralizing agent comprising 50 weight % of Mg(OH)$_2$ blended in a polymer carrier comprised of an E/5% MM dipolymer with MI of 500.

The values shown in parentheses in Tables 1 and 2 are wt %.

TABLE 1

| Ex | Resin 1 | Resin 2 | Resin 3 | Organic Acid Salt | Neutralizing agent | OPV |
|---|---|---|---|---|---|---|
| 1 | Ionomer1 (51.2) | EMA2 (13.04) | EMAA1 (11.6) | Mg Stearate (22.10) | NA1 (2.0) | 20,541 |
| 2 | Ionomer1 (58.18) | EMA2 (14.67) | none | Mg Stearate (24.94) | NA1 (2.21) | 35,600 |
| 3 | Ionomer1 (54.5) | EMA2 (4.87) | EMA1 (14.6) | Mg Stearate (23.36) | NA1 (2.68) | 43,200 |
| 4 | Ionomer2 (49) | EBA1 (30) | none | Mg Stearate (21) | none | 24,390 |
| 5 | Ionomer2 (56) | EBA1 (20) | none | Mg Stearate (24) | none | 23,850 |
| 6 | Ionomer2 (63) | EBA1 (10) | none | Mg Stearate (27) | none | 21,000 |
| C1 | Ionomer3 (100) | none | none | none | none | 7,070 |
| 7 | Ionomer2 (80) | none | none | Mg Stearate (20) | none | 19,090 |
| 8 | Ionomer2 (70) | none | none | Mg Stearate (35) | none | 20,990 |
| 9 | Ionomer2 (90) | none | none | Mg Stearate (10) | none | 19,360 |

TABLE 2

| Ex. | Base resin[1] | Stearate[2] | NeuA[3] | EMA2[4] | EMAA2[5] | MI[6] | OPV[7] | $CO_2$-PV[8] |
|---|---|---|---|---|---|---|---|---|
| 10 | ACR1(59.63) | MgSt(23.42) | NA1(3.18) | 13.78% | 0 | 0.49 | 20,400 | ND |
| 11 | ACR1(53.39) | MgSt(20.74) | NA(2.82) | 23.05% | 0 | 0.79 | 20,200 | ND |
| 12 | ACR1(47.10) | MgSt(18.05) | NA1(2.45) | 32.40% | 0 | 1.65 | 21,500 | ND |
| 13 | ACR2(58.58) | MgSt(22.960) | NA1(4.95%) | 13.51% | 0 | 0.89 | 17,400 | ND |
| 14 | ACR2(50.07) | MgSt(21.46) | NA1(4.63) | 23.84% | 0 | 1.85 | 20,000 | ND |
| 15 | ACR2(43.66) | MgSt(18.71) | NA1(4.04) | 33.59% | 0 | 3.35 | 21,900 | ND |
| 16 | Ionomer4(51.81) | MgSt(22.20) | NA1(2.92) | 13.06% | 10 | 0.35 | 20,000 | ND |
| 17 | Ionomer4(39.92) | MgSt(17.11) | NA1(2.25) | 30.71% | 10% | 0.78 | 21,500 | ND |
| 18 | EMAA1(36.6) | NA2[9](45.9) | NA1(3.7) | 13.60% | 0 | 0.6 | 19,200 | ND |
| 19 | ACR3(58.77) | CaSt(39.17) | Ca(OH)$_2$(2.06) | 0 | 0 | 0.13 | 12,000 | 49,400 |
| 20 | ACR4(76.38) | IsoSt(19.1) | Mg(OH)$_2$(4.52) | 0 | 0 | 4.73 | 40,000 | 176,000 |
| 21 | 50:50 blend of 16-1 & 16-3 | | | | 0 | ND | 47,900 | 194,000 |
| 22 | ACR4(56.36) | IsoSt(37.57) | Mg(OH)$_2$(6.06) | 0 | 0 | 5.71 | 58,000 | 234,000 |
| 23 | ACR4(79.66) | Beh(19.16) | Mg(OH)$_2$(4.18) | 0 | 0 | 2.8 | 18,400 | 62,700 |
| 24 | 50:50 blend of 16-7 and 16-9 | | | | 0 | ND | 15,200 | 52,100 |
| 25 | ACR4(56.78) | Beh(37.85) | Mg(OH)$_2$(5.37) | 0 | 0 | 5.1 | 15,400 | 55,900 |
| 26 | ACR1(47.70) | MgSt(20.44 | NA1(2.65) | 29.21 | | 5.8 | 19,500 | 81,800 |

[1]ACR1 = E/10% iBA/10% MAA/35MI; ACR2: E/15% MAA/220MI; 10 was E/15% MAA/60MI; ACR3: E/12% AA/85MI; ACR-4: E/23.5% nBA/9% MAA/200MI; Ionomer-4: E/19% MAA/60MI neutralized with Mg into 1.1MI.
[2]Fatty acid salt used was magnesium stearate except Example 18 (NA2: 50% Mg stearate in EMAA1), Examples 19 (calcium stearate), Examples 20, 21, and 22 (12-iso-stearic acid), and Examples 23, 24 and 25, (behenic acid)
[3]NeuA = neutralization agent, Examples 10-18 and 26 (NA1: 50 wt % of Mg(OH)$_2$ master batch in E/5% MAA/500MI), Example 19 (calcium hydroxide), Examples 20 to 25 (magnesium hydroxide).
[4]EMA2: E/24% methyl acrylate/20MI;
[5]EMAA2: E/19% MAA/60MI
[6]Melt index at 190° C.
[7]OPV after aging at room temperature (about 25° C.)
[8]$CO_2$ permeability value; ND = not determined
[9]NA2: 50 w % Mg stearate in EMAA1

The invention claimed is:

1. An article comprising a multilayer film or sheet which comprises a structure layer, an oxygen permeable layer, and optionally an additional polymer layer wherein
the article is permeable to oxygen;
the structure layer is a rigid or semi-rigid layer and the oxygen permeable layer comprises or is produced from one or more E/X/Y copolymers or ionomers of the E/X/Y copolymers, one or more organic acids, and optionally one or more ethylene-containing polymers, one or more silicon-containing polymers, or combinations of two or more thereof;
E is derived from ethylene, X is derived from at least one $C_3$ to $C_8$ α, β-ethylenically unsaturated carboxylic acid, and Y is an optional comonomer and is derived from a softening comonomer including alkyl acrylate, alkyl methacrylate, or combinations thereof; the alkyl group has from 1 to 8 carbon atoms;
the organic acid is an aliphatic acid or salt thereof each having fewer than 36 carbon atoms;
the acid moieties in the E/X/Y copolymer and organic acid are nominally neutralized;
the structure layer includes cellulose, cellulose derivative, polymer resin, or combinations of two or more thereof;
the cellulose derivative is in the form of paper, paperboard, cardboard, pulp-molded shape, or combinations of two or more thereof; and
the polymer resin is in the form of an open-cell foam, melt bonded non-woven porous sheet, or combinations of two or more thereof.

2. The article of claim 1 wherein the structure layer is in contact with the oxygen permeable layer and the oxygen permeable layer has an oxygen permeation value greater than 10,000 mil-cc/m$^2$-day.

3. The article of claim 2 wherein the oxygen permeable layer further comprises a metallocene-catalyzed polyethylene, an ethylene/vinyl acetate copolymer, ethylene alkyl (meth)acrylate copolymer, or combinations of two or more thereof.

4. The article of claim 2 wherein the article further comprises at least one additional polymer layer including one or more ethylene-containing polymers, one or more silicon-containing polymers, or combinations of two or more thereof.

5. The article of claim 1 wherein the article comprises at least two oxygen permeable layers in which (1) the oxygen permeable layers are on each side of the structure layer, (2) at least one of the oxygen permeable layers is part of the structure layer, or both (1) and (2).

6. The article of claim 4 further comprising the additional polymer layer, which comprises one or more ethylene-containing polymers, one or more silicon-containing polymers, or combinations of two or more thereof.

7. The article of claim 5 wherein the article further comprises the additional polymer layer, which comprises an ethylene-containing polymer selected from the group consisting of ethylene homopolymers and copolymers; metallocene polyethylene; ethylene propylene copolymers; ethylene/propylene/diene monomer terpolymers; or ethylene copolymers derived from copolymerization of ethylene and at least one comonomer selected from the group consisting of alkyl (meth)acrylate, vinyl acetate, CO, and combinations of two or more thereof.

8. The article of claim 6 wherein the article or the oxygen permeable layer comprises the ethylene-containing polymer including ethylene vinyl acetate copolymer, metallocene polyethylene, an ethylene alkyl (meth)acrylate copolymer, or combinations of two or more thereof.

9. The article of claim 5 wherein the article is a monolithic membrane and the article comprises the silicon-containing polymer selected from the group consisting of ethylene vinyl silane copolymers, polysiloxane, silicone rubber, and combinations of two or more thereof.

10. An article comprising a structure layer, an oxygen permeable layer, and optionally at least one other polymer layer wherein
the structure layer is melt-bonded to the oxygen permeable layer;
the structure layer is a semi-rigid or rigid structure;
the oxygen permeable layer has an oxygen permeation value greater than 10,000 mil-cc/m²-day; and
the structure layer comprises a cellulose derivative, polymeric resin, or combinations thereof; cellulose derivative is in the form of paper, paperboard, cardboard, pulp-molded shape, or combinations of two or more thereof; and the polymeric resin is in the form of an open-cell foam, a melt bonded non-woven porous sheet, or combinations of two or more thereof.

11. The article of claim 10 wherein
the article is permeable to $CO_2$;
the permeable layer comprises or is produced from one or more E/X/Y copolymers or ionomers of the E/X/Y copolymers, at least one organic acid, and optionally one or more ethylene-containing polymers, one or more silicon-containing polymers, or combinations of two or more thereof;
E is derived from ethylene, X is derived from at least one $C_3$ to $C_8$ α,β-ethylenically unsaturated carboxylic acid, and Y is an optional comonomer and is derived from a softening comonomer including alkyl acrylate, alkyl methacrylate, or combinations thereof; the alkyl group has from 1 to 8 carbon atoms;
the organic acid is an aliphatic acid or salt thereof each having fewer than 36 carbon atoms;
the acid moieties in the E/X/Y copolymer and organic acid are nominally neutralized;
the structure layer includes cellulose, cellulose derivative, polymer resin, or combinations of two or more thereof.

12. The article of claim 11 wherein the article or the oxygen permeable layer further comprises an ethylene vinyl acetate copolymer, a metallocene polyethylene, an ethylene alkyl (meth)acrylate copolymer, or combinations of two or more thereof.

13. The article of claim 11 wherein the article further comprises at least one additional polymer layer including one or more ethylene-containing polymers, one or more silicon-containing polymers, or combinations of two or more thereof.

14. The article of claim 13 further comprising the additional polymer layer, which is the ethylene-containing polymer selected from the group consisting of ethylene homopolymers and copolymers; metallocene polyethylene; ethylene propylene copolymers; ethylene/propylene/diene monomer terpolymers; or ethylene copolymers derived from copolymerization of ethylene and at least one comonomer selected from the group consisting of alkyl (meth)acrylate, vinyl acetate, CO, and combinations of two or more thereof.

15. The article of claim 14 wherein the ethylene-containing polymer is an ethylene vinyl acetate copolymer, metallocene polyethylene, an ethylene alkyl (meth)acrylate copolymer, or combinations of two or more thereof.

16. The article of claim 13 wherein the polymer in the additional polymer layer is the silicon-containing polymer including ethylene vinyl silane copolymers, polysiloxane, silicone rubber, or combinations of two or more thereof.

17. A package comprising the article as recited in claim 10 and the package or the article optionally comprises a gas permeable film.

18. The package of claim 17 wherein the gas permeable film comprises or is produced from one or more E/X/Y copolymers or ionomers of the E/X/Y copolymers, one or more organic acids, and optionally one or more ethylene-containing polymers, one or more silicon-containing polymers, or combinations of two or more thereof;
E is derived from ethylene, X is derived from at least one $C_3$ to $C_8$ α,β-ethylenically unsaturated carboxylic acid, and Y is an optional comonomer and is derived from a softening comonomer including alkyl acrylate, alkyl methacrylate, or combinations thereof; the alkyl group has from 1 to 8 carbon atoms;
the organic acid is an aliphatic acid or salt thereof each having fewer than 36 carbon atoms;
the acid moieties in the E/X/Y copolymer and organic acid are nominally neutralized;
the structural layer includes cellulose, cellulose derivative, polymer resin, or combinations of two or more thereof.

19. The package of claim 17 wherein the package or the article comprises the gas permeable film comprising or produced from metallocene polyethylene, ethylene vinyl acetate copolymer, ethylene alkyl (meth)acrylate copolymer, or combinations of two or more thereof.

20. The package of claim 17 including a vacuum skin package.

21. The package of claim 17 further comprising one or more food products including a food requiring an oxygen atmosphere or food requiring removal of $CO_2$ wherein the food requiring an oxygen atmosphere includes case ready meat, fish, or sausage and the food requiring removal of $CO_2$ includes fresh produce and fruits.

* * * * *